United States Patent [19]

Skarky

[11] Patent Number: 4,583,142
[45] Date of Patent: Apr. 15, 1986

[54] SLIDE LOCK MECHANISM FOR DISK DRIVES

[75] Inventor: Loren D. Skarky, Bethany, Okla.

[73] Assignee: Magnetic Peripherals Inc., Minneapolis, Minn.

[21] Appl. No.: 488,565

[22] Filed: Apr. 25, 1983

[51] Int. Cl.$^4$ ............................................. G11B 21/22
[52] U.S. Cl. ..................................... 360/105; 360/106
[58] Field of Search ............. 360/105, 106; 74/100 R, 74/100 P; 188/67; 267/159

[56] References Cited

U.S. PATENT DOCUMENTS 2,169,822  8/1939  Armstrong-Taylor ............... 74/100
2,473,088  6/1949  Bain ....................................... 74/100

FOREIGN PATENT DOCUMENTS 55-150170  11/1980  Japan ................................... 360/106

OTHER PUBLICATIONS

Troke, et al., "An Actuator Transit Latch," IBM Technical Disclosure Bulletin, vol. 20, No. 5, 10-77, pp. 1986-1987.

Primary Examiner—John H. Wolff
Assistant Examiner—Matthew J. Bussan
Attorney, Agent, or Firm—R. M. Angus; J. A. Genovese

[57] ABSTRACT

A slide lock mechanism for restraining movement of the carriage of a disk drive comprises a rod slideably supported by the disk drive housing for movement between two rest positions. A lock pin, fastened to a shaft engaging the rod, is moveable between a lock and unlock position to bias a pin, fastened to the carriage, against a stop when the rod is in one of its rest positions. An over-center spring, fastened to the housing and rod biases the rod to its two rest positions.

3 Claims, 4 Drawing Figures

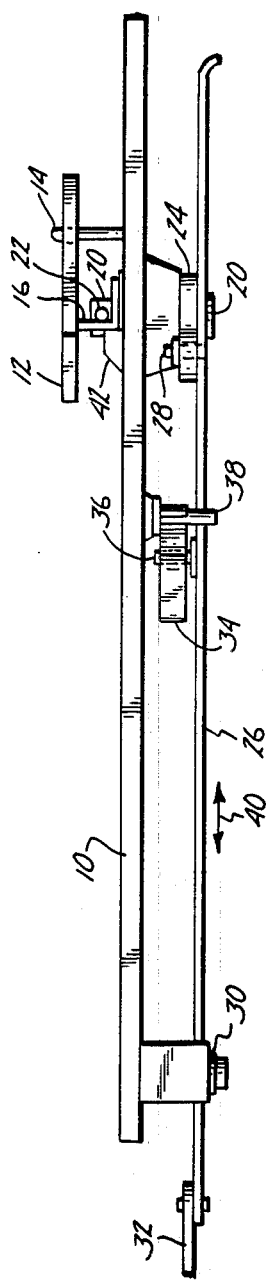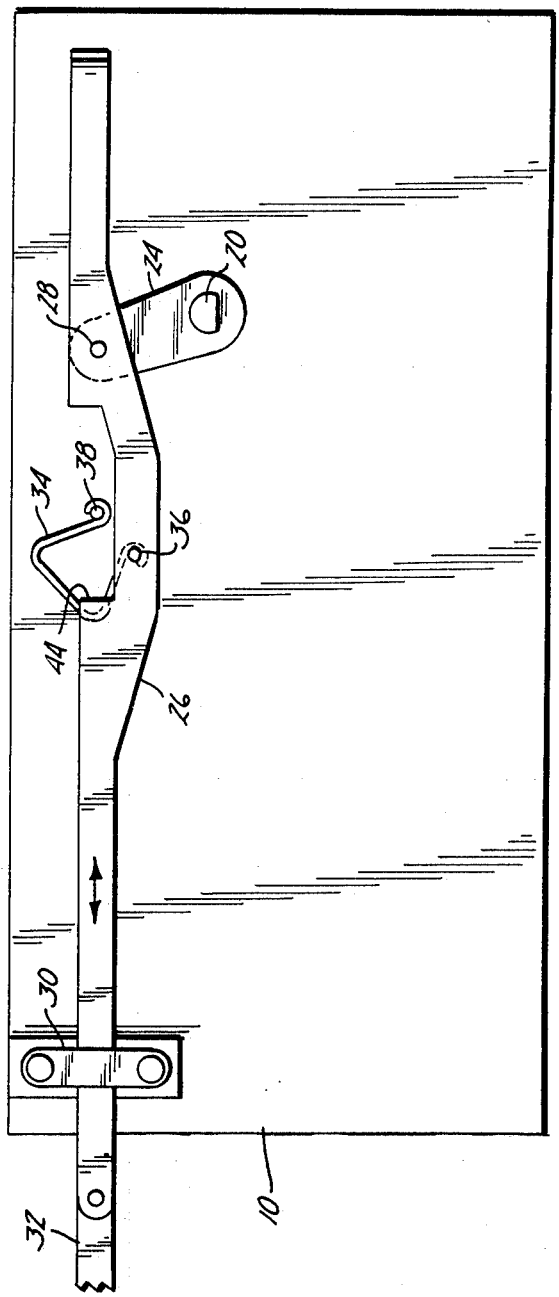

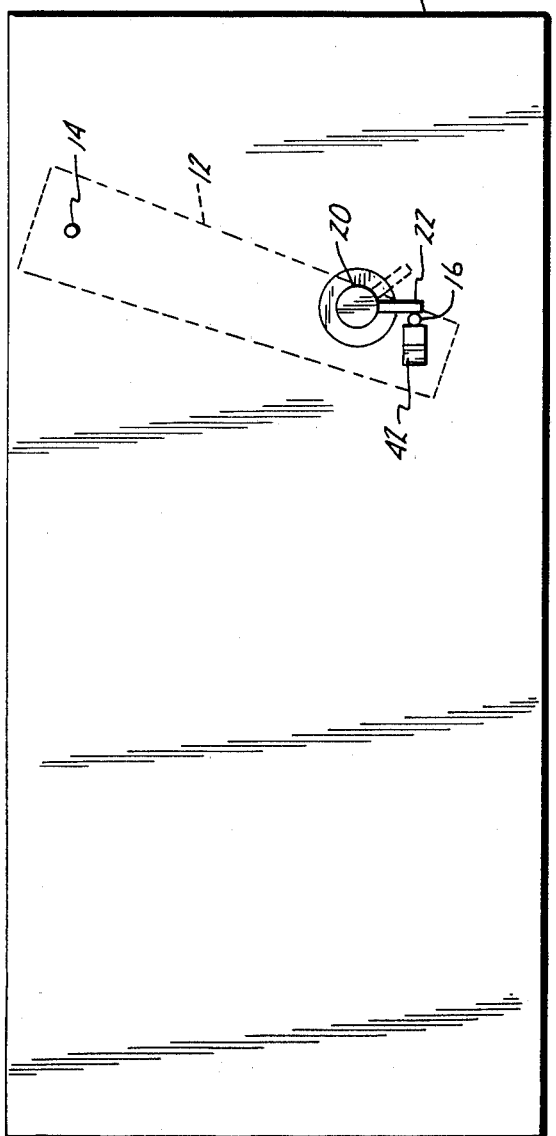
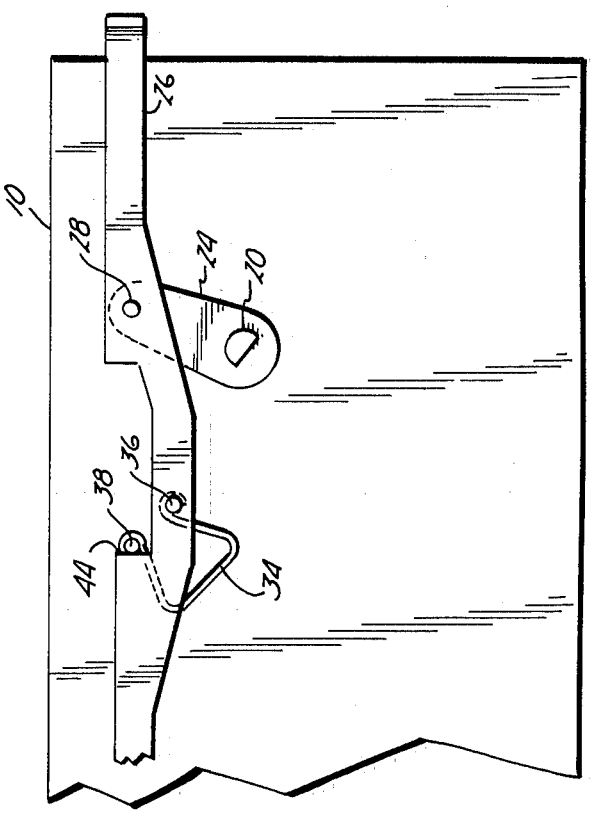

SLIDE LOCK MECHANISM FOR DISK DRIVES

This invention relates to a slide lock mechanism for locking the carriage of a disk drive.

It is desirable to restrain the carriage of a disk drive from movement at certain times, for example when transporting the disk drive. A disk drive carriage has attached to it a head-arm assembly and magnetic read/write head, which are delicate instruments. If the carriage is allowed to move when the drive sustains rough handling, such as during shipping, damage to the head and/or disk could occur. Therefore, it is ordinary practice to restrain the carriage while the disk drive is transported, the restraints ordinarily being clips or clamps to restrain the carriage, or packing material to restrain the entire disk drive and carriage. To prevent damage to the disk drive, head or disk, a trained technician was ordinarily required to unpackage the disk drive and ready it for use in a computer system. With the advent of personal computers, the market direction is toward smaller, transportable, user-installable systems. Thus, there is a need for a restraining device for the carriage of the disk drive which is user operable.

The present invention relates to a slide lock mechanism for locking the position of the carriage of a disk drive.

In particular, the present invention concerns a slide lock mechanism supported by the disk drive housing and operable to clamp a portion of the disk carriage to a stop mechanism. The slide lock mechanism is operable between two rest positions, one in which the mechanism clamps the carriage to the stop, and one where the carriage is free of the mechanism.

One feature of the present invention resides in the fact that the slide lock mechanism has two well-defined rest positions.

The above and other features of this invention will be more fully understood from the following detailed description, and the accompanying drawings, in which:

FIG. 1 is a side view of a slide lock mechanism for locking the carriage of a disk drive in accordance with the presently preferred embodiment of the present invention;

FIG. 2 is a bottom view of the apparatus illustrated in FIG. 1;

FIG. 3 is a top view of the apparatus illustrated in FIGS. 1 and 2; and

FIG. 4 is a bottom view, as in FIG. 2, of a portion of the apparatus with the mechanism in a second rest position, opposite from that illustrated in FIG. 2.

With reference to the drawings, there is illustrated a disk drive housing 10 having a carriage 12 supporting a head-arm assembly and head (not shown) for reading and/or writing data on a magnetic disk (not shown) contained in housing 10. Carriage 12 may be journaled to shaft 14 to rotate about the axis of the shaft to swing the head adjacent to the surface of the magnetic disk, or the head or the carriage may be a linear-actuated carriage moveable radially across the disk. In either case, carriage 12 also carries a pin 16 on its underside.

The slide lock mechanism according to the present invention includes a shaft 20 journaled to housing 10 for rotation about the shaft axis and carrying a radially protruding pin 22. The lower end of shaft 20 is fastened to lever 24, the opposite end of which is journaled to slide rod 26 by pin 28. Rod 26 is slideably supported in housing 10 by strap 30. A handle or other suitable mechanism 32 may be fastened to an end of rod 26. For example, mechanism 32 may be operable through an aperture in the front panel of the drive housing to lock the carriage whenever the disk drive is not in use. Over-center spring 34 is fastened to rod 26 by pin 36 and to housing 10 by pin 38. A comparison of FIGS. 2 and 4 will reveal that rod 26 is slideable in the direction of arrow 40 between a first rest position illustrated in FIG. 2 wherein pin 22 on shaft 20 bears against pin 16 on carriage 12 so that pin 16 is clamped against stop 42, and a second rest position, illustrated in FIG. 4, wherein rod 26 is in its forward position and shoulder 44 of rod 26 bears against pin 38. Spring 34 serves to bias the rod 26 to both its rest positions illustrated in FIGS. 2 and 4.

In the case of sealed disk housings wherein the disk and head assembly are sealed from atmospheric contaminants, an O-ring seal (not shown) may be incorporated with shaft 20 where it is journaled to housing 10 to provide a fluid seal between the housing and the shaft.

To operate the slide lock mechanism rod 26 is moved in the direction of arrow 40 from one rest position to the other thereby rotating shaft 20 between its first rotational position where pin 22 restrains pin 16 against stop 42 and its second rotational position where pin 22 is free of pin 16 so the carriage may move. When in its lock position, the carriage may rest on the magnetic disk (not shown) in a defined landing zone thereon; the lock mechanism assuring that the carriage does not leave the landing zone.

The slide lock mechanism according to present invention is inexpensive and effective in operation. The mechanism effectively locks the carriage to prevent damage to the disk, carriage, head assembly and/or head. The head mechanism is operable from outside of the disk drive housing.

This invention is not to be limited by the embodiment shown in the drawings and described in the description, which is given by way of example and not of limitation, but only in accordance with the scope of the appended claims.

What is claimed is:

1. A slide lock mechanism for restraining movement of a head-arm carriage of a disk drive against a stop, said lock mechanism comprising:

a rod slideably supported by the disk drive housing and movable between a first rest position and a second rest position;

a shaft rotatably supported by said housing and engaged to said rod to rotate between a first rotational position and a second rotational position when said rod is moved between its respective first and second rest positions;

a lock pin fastened to said shaft, said lock pin being movable between a lock position and an unlock position when said shaft is moved between its respective first and second rotational positions, said lock pin bearing against said carriage to restrain said carriage against said stop when said lock pin is in its lock position and being free of said carriage when said lock pin is in its unlock position, said first rest position being defined by said lock pin being in its lock position to restrain said carriage against said stop; and spring bias means fastened to said rod and said housing to bias said rod to its respective first and second rest positions, whereby when said lock pin is in its lock position said lock pin continuously bears said carriage against said stop under the bias influence of said spring bias means.

2. A slide lock mechanism in accordance with claim 1 wherein said spring bias means is an over-center spring, first fastening means fastening one end of said spring to said rod and second fastening means fastening the other end of said spring to said housing, said rod having a shoulder, said second fastening means bearing against said shoulder to define the second rest position of said rod.

3. A slide lock mechanism according to claim 1 wherein said carriage includes a stop pin, said lock pin being positioned to bias said stop pin against said stop when said lock pin is in its lock position.

* * * * *